(12) United States Patent
Iwanami et al.

(10) Patent No.: US 7,748,226 B2
(45) Date of Patent: Jul. 6, 2010

(54) WASTE HEAT UTILIZING SYSTEM

(75) Inventors: Shigeki Iwanami, Okazaki (JP); Hironori Asa, Okazaki (JP); Keiichi Uno, Kariya (JP); Yasushi Suzuki, Chiryu (JP); Shigeru Hisanaga, Kariya (JP); Atsushi Inaba, Kariya (JP); Koichi Ban, Tokai (JP); Takashi Yamanaka, Kariya (JP); Yasushi Yamanaka, Nakashima-gun (JP); Kazuhide Uchida, Hamamatsu (JP); Tadashi Hotta, Okazaki (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 1882 days.

(21) Appl. No.: 10/797,087

(22) Filed: Mar. 11, 2004

(65) Prior Publication Data

US 2004/0187506 A1    Sep. 30, 2004

(30) Foreign Application Priority Data

Mar. 25, 2003 (JP) ............................. 2003-82760
Apr. 1, 2003 (JP) ............................. 2003-98461

(51) Int. Cl.
 *F25B 27/02* (2006.01)
(52) U.S. Cl. ..................... 62/236; 62/238.7
(58) Field of Classification Search ............... 62/236, 62/238.6–238.7
See application file for complete search history.

(56) References Cited

U.S. PATENT DOCUMENTS

| | | | | |
|---|---|---|---|---|
| 4,010,378 A | * | 3/1977 | Tharpe et al. | 290/2 |
| 4,218,891 A | * | 8/1980 | Schwartzman | 62/116 |
| 4,347,711 A | | 9/1982 | Noe et al. | |
| 5,887,434 A | | 3/1999 | Arnell et al. | |
| 6,640,562 B2 | | 11/2003 | Odachi et al. | |
| 6,823,690 B2 | | 11/2004 | Runk et al. | |
| 2003/0079484 A1 | * | 5/2003 | Matsuoka | 62/180 |
| 2003/0115877 A1 | | 6/2003 | Bara et al. | |
| 2004/0216483 A1 | | 11/2004 | Inaba et al. | |

FOREIGN PATENT DOCUMENTS

DE          28-48-532         11/1978

(Continued)

OTHER PUBLICATIONS

U.S. Appl. No. 10/764,534, filed Jan. 27, 2004, Iwanami et al.

(Continued)

*Primary Examiner*—William E Tapolcai
(74) *Attorney, Agent, or Firm*—Posz Law Group, PLC

(57) ABSTRACT

A waste heat collecting system for an internal combustion engine has an object to collect waste heat from the engine and make most use of the collected waste heat to achieve the maximum effect of improving fuel consumption ratio. The waste heat utilizing system has a waste heat collecting cycle for collecting waste heat from an internal combustion engine and having an expansion device for generating rotational driving force from the collected waste heat, a refrigerating cycle having a compressor device for compressing a refrigerant and a power transmitting means rotationally driven by a driving force generating means and operatively connected to the compressor device to rotationally drive the same. In this system, the expansion device is operatively connected to the compressor device to rotationally drive the same.

13 Claims, 10 Drawing Sheets

FOREIGN PATENT DOCUMENTS

| | | |
|---|---|---|
| DE | 43 09 119 A1 | 9/1994 |
| DE | 100 35 720 A1 | 2/2002 |
| JP | A-58-012819 | 1/1983 |
| JP | A-63-099464 | 4/1988 |
| JP | B2-2540738 | 7/1996 |
| JP | A-H09-126171 | 5/1997 |
| JP | A-2000-46429 | 2/2000 |
| JP | A-2002-115931 | 4/2002 |
| JP | A-2002-205536 | 7/2002 |
| JP | A-2003-083245 | 3/2003 |
| WO | WO 00/71944 A1 | 11/2000 |

OTHER PUBLICATIONS

Communication from French Patent Office dated Jun. 28, 2005.

Examination Report dated Feb. 6, 2009 in corresponding German patent application No. 04 012 795.6 (and English translation).

Office Action dated Aug. 27, 2008 in corresponding French patent application No. PMA-BT 976/ 04 03076.

Translation of Office Action from German Patent Office dated Feb. 9, 2007 for corresponding German patent application No. 10-2004-12 795.6-16 dated Nov. 27, 2006 (English translation thereof).

Notice of Official Rejection from Japanese Patent Office issued on Aug. 29, 2006 for the corresponding Japanese patent application No. 2003-098461 (and English translation thereof).

First Office Action from Chinese Patent Office issued on Mar. 3, 2006 for the corresponding Chinese patent application No. 200410030011.0 (English translation thereof).

Office Action from German Patent Office issued on Feb. 15, 2006 for the corresponding German patent application No. 10 2004 012 795.6 (English translation thereof).

Japanese Office Action mailed Aug. 7, 2007 in corresponding Japanese Patent Application No. 2003-082760 (and English Translation).

Office Action dated Nov. 23, 2009 from the German Patent and Trademark Office in corresponding patent application No. 10 2004 012 795.6-16 (English translation enclosed).

* cited by examiner 22, 24, 320, 170, 120 (FIG. 10)

— IDLE-STOP SIGNAL
— AIR-CONDITIONING SIGNAL

WASTE HEAT UTILIZING SYSTEM

CROSS REFERENCE TO RELATED APPLICATION

This application is based on Japanese Patent Application Nos. 2003-82760 filed on Mar. 25, 2003 and 2003-98461 filed on Apr. 1, 2003, the disclosures of which are incorporated herein by reference.

FIELD OF THE INVENTION

In recent years, fuel consumption ratio for a motor vehicle is remarkably improved in view of environmental issues, and a so-called idle-stop vehicle or a hybrid vehicle is available in a market. A hybrid compressor for air-conditioning operation for such vehicles is known, which is operated by driving force from an engine or a motor. This kind of hybrid compressor keeps the air-conditioning operation during the engine is stopped, while it improves the fuel consumption ratio for the vehicles. The applicant of the present invention proposed a fluid machinery having a function of collecting waste heat from the engine and making use of the collected energy, in its prior patent application No. 2003-19139, in order to achieve a further improvement of the fuel consumption ratio.

BACKGROUND OF THE INVENTION

As prior art technology, a waste heat utilization apparatus for an internal combustion engine is known as shown in Japanese Patent No. 2540738. In this apparatus, Rankine cycle is formed by using components of a refrigerating cycle, in which a compressor is also used as an expansion device for collecting waste heat from an internal combustion engine and supplying the collected power back to the internal combustion engine. In the above prior art apparatus, however, it is disadvantageous in that the collection of the waste heat from the engine is only possible when an operation of the refrigerating cycle is not necessary.

In the fluid machinery mentioned above, namely the fluid machinery (prior patent application No. 2003-19139) proposed by the same applicants, a compressor portion of the hybrid compressor is also used as an expansion device, wherein the compressor portion is operated as the compressor by an engine or a motor to compress refrigerant in a refrigerating cycle when the air-conditioning operation is necessary, while the compressor portion is operated as an expansion device to generate electric power at the motor when the air-conditioning operation is not necessary in such a way that the refrigerant of superheated steam is supplied to the compressor portion and the superheated steam is expanded in the compressor portion to generate rotational driving force. It should be noted here, however, the above mentioned fluid machinery is not a prior art to the present invention.

SUMMARY OF THE INVENTION

It is, therefore, an object of the present invention, in view of the above mentioned problems, to provide a waste heat collecting system which can achieve a maximum effect for improving the fuel consumption ratio by making most use of collected waste heat energy when it is operated to compress fluid (refrigerant of a refrigerating cycle) or to generate electric power.

It is another object of the present invention to provide a waste heat collecting system for an internal combustion engine, in which waste heat can be collected irrespectively of an operation or non-operation of a refrigerating cycle and furthermore the collected waste heat energy can be used for multi purposes.

According to a feature of the present invention, a waste heat utilizing system comprises an outside driving means (e.g. a pulley driven by an internal combustion engine), a compressor device operatively connected to and driven by the outside driving means and constituting a part of a refrigerating cycle for compressing refrigerant of the cycle, and an expansion device operatively connected to the compressor device and constituting a part of waste heat collecting cycle to generate a rotational driving force by making use of the collected waste heat energy, so that the rotational driving force is applied to the compressor device. As a result of this feature, the compressor device can be continuously operated by the driving force from the expansion device even during the engine operation is stopped.

According to another feature of the present invention, a waste heat utilizing system further comprises an electric rotating machine device operatively connected to the outside driving means and to the compressor device, wherein the rotating machine can be operated as an electric motor and as an electric power generator. As a result of this feature, when the electric rotating machine is operated as the electric motor generating rotational driving force, the compressor device can be continuously operated by the driving force from the electric rotating machine even during the engine operation is stopped.

According to a further feature of the present invention, the electric rotating machine is operatively connected to the expansion device, so that the rotating machine can be operated by the driving force from the expansion device to generate electric power. This electric power generation is most effectively performed when the compressor device is not necessary to be operated and the driving force generated at the expansion device is enough to drive the electric rotating machine.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

A first embodiment of the present invention will now be explained with reference to FIGS. 1 through 4. A waste heat utilizing system of the present invention is used to, for example, a motor vehicle, which is equipped with an air-conditioning system. More particularly, the present system can be used for a so-called idle stop vehicle, in which an engine operation is stopped when the vehicle is not running, for example, when the vehicle is stopping at a traffic red lamp.

Figure 1:
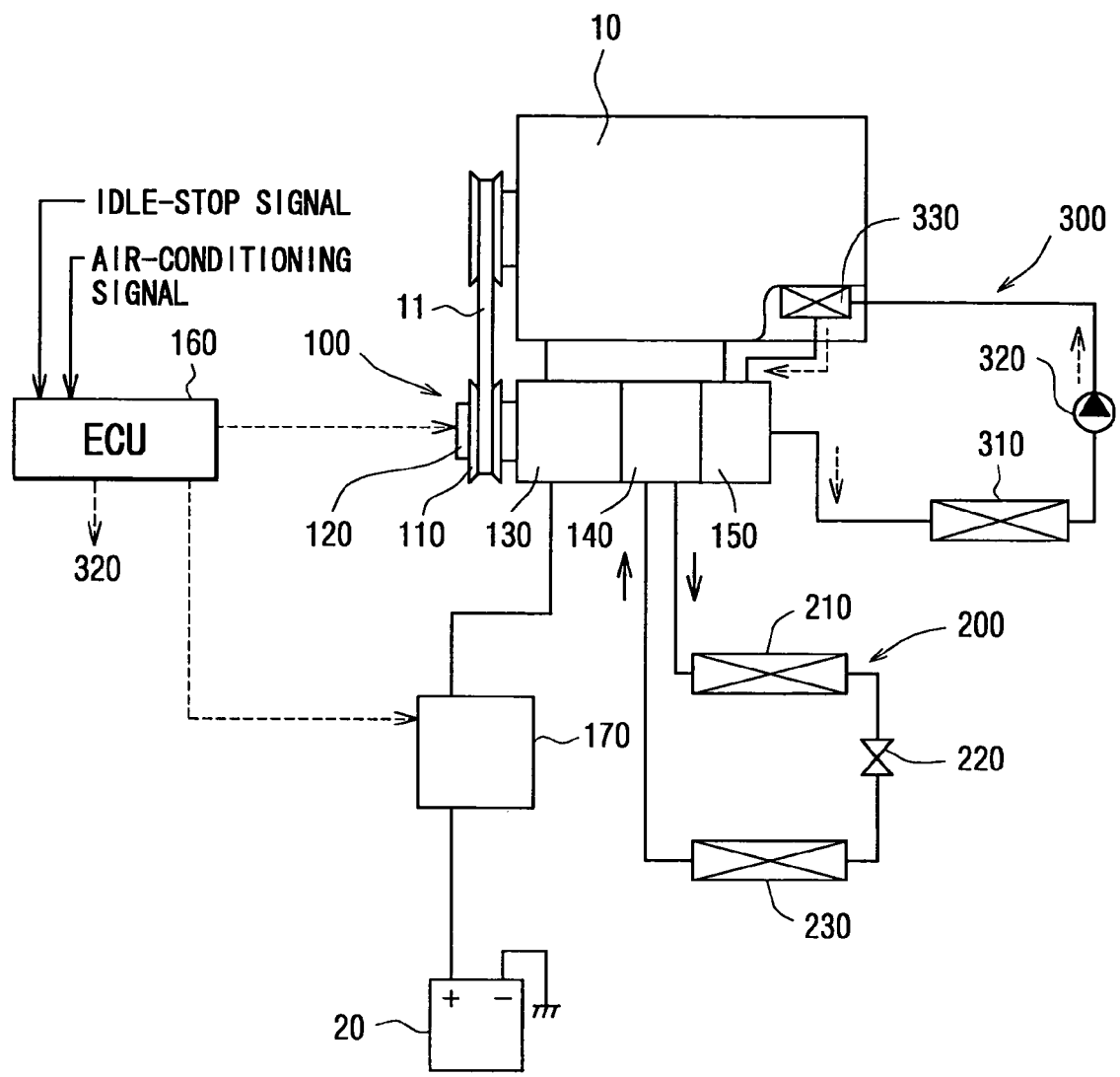
FIG. 1 is a schematic diagram showing a first embodiment of a waste heat utilizing system according to the present invention.

In FIG. 1, the waste heat utilizing system has a fluid machinery 100, which comprises a pulley 110 rotationally supported by a pulley bearing 112 (FIG. 2) and connected to an internal combustion engine 10 via a belt 11, an electromagnetic clutch 120, an electric rotating machine 130 which can operate as both an electric motor and an electric power generator, a compressor device 140 constituting a part of a refrigerating cycle 200, and an expansion device 150 constituting a part of a waste heat collecting cycle 300 (for example Rankine cycle).

In the waste heat utilizing system, An inverter 170 is connected to the electric rotating machine 130 and to a battery 20. An air-conditioning signal, an idle-stop signal and so on are input to an electronic control unit 160, which controls, in accordance with those signals, on-and-off of the electromagnetic clutch 120, the operation of the electronic rotating machine 130 via the inverter 170 and the operation of the pump 320.

In the refrigerating cycle 200, a condenser 210 is connected to an outlet of the compressor device 140 incorporated into the fluid machinery 100, which will be explained later, and is a heat exchanger for condensing refrigerant through heat radiation. An expansion valve 220 decompresses and expands the refrigerant condensed by the condenser 210. In this embodiment, the expansion valve is of a temperature dependent type is used, wherein a throttle area is so controlled that the refrigerant is decompressed in an isenthalpic manner and superheat of the refrigerant to be sucked into the compressor device 140 is kept at a predetermined value.

An evaporator 230 is a heat exchanger for evaporating the refrigerant, which is decompressed and expanded by the expansion valve 220, and then cooling down the air by means of the evaporation latent heat. An outlet of the evaporator 230 is connected to an inlet of the compressor device 140. The compressor device 140, the condenser 210, the expansion valve 220 and the evaporator 230 are connected in a closed circuit to form the refrigerating cycle 200.

The waste heat collecting cycle 300 comprises an expansion device 150 incorporated into the fluid machinery 100, which will be explained later, a heat radiating device 310, a pump 320 and a heating device 330. The heat radiating device 310 is a heat exchanger for condensing the refrigerant flowing out from the expansion device 150. The pump 320 circulates the refrigerant from the heat radiating device 310 to the heating device 330 in the waste heat collecting cycle 300. The pump 320 is of an electrically-driven type in this embodiment. The heating device 330 is a heat exchanger for heating the refrigerant through heat exchange between the refrigerant flowing through a refrigerant passage and engine coolant. The refrigerant of superheated steam heated by the heating device 330 is supplied to the expansion device 150.

The detailed structure of the fluid machinery 100 is explained with reference to FIGS. 2 through 4.

The pulley 110 constitutes an outside driving portion, which is rotationally supported by the pulley bearing 112 fixed to a front housing 101, and is rotated by driving force transmitted from the engine 10 via the belt 11. A driving shaft 111 is provided at a center portion of the pulley 110 and is rotationally supported by a bearing 113 fixed to the front housing 101. The driving shaft 111 is rotated in a clockwise direction as its normal rotational direction when viewed from a direction shown by an arrow A in FIG. 2.

The electromagnetic clutch 120 constitutes an on-and-off device for intermittently transmitting the driving force from the pulley 110 to the driving shaft 111, and comprises a coil 121 fixed to the front housing 101 and a hub 122 fixed to an end of the driving shaft 111. As well known, when the electric power is supplied to the coil 121, the hub 122 is pulled and firmly held by the pulley 110, so that the electromagnetic clutch 120 transmits the driving force from the pulley 110 to the driving shaft 111 (ON state of the clutch). On the other hand, when the electric power is cut off, the hub 122 will be pulled away from the pulley 110, so that the transmission of the driving force of the pulley 110 is cut off (OFF state of the clutch).

The electric rotating machine 130 (hereinafter referred to as a motor) has a function of an electric motor and a function of an electric power generator, which comprises a rotor portion 132 and a stator portion 133 and is disposed in a space formed by the front housing 101, a rear housing 102 and a partition wall 103. The rotor portion 132 is fixed to a motor shaft 131 and a magnet (a permanent magnet) 132a is provided at its outer periphery. The motor shaft 131 is coaxially connected to the driving shaft 111 and rotationally supported by bearings 113 and 114.

The stator portion 133 provided with a coil 133a is press fitted into an inner surface of the front housing 101. When an electric power is supplied to the coil 133a from the battery 20 (FIG. 1) via the inverter 170 (FIG. 1), the rotor portion 132 will be rotated (in the clockwise direction when viewed from the arrow A). And in case that the motor portion operates as the electric power generating machine by the driving force from the pulley 110 or the expansion device 150 explained below, the electric power generated at the coil 133a will be charged to the battery 20 via the inverter 170.

The compressor device 140, which is here a vane type and discharge fixed type compressor, is disposed in the rear housing 102 and on a side of the motor 130 opposite to the pulley.

Figure 2:
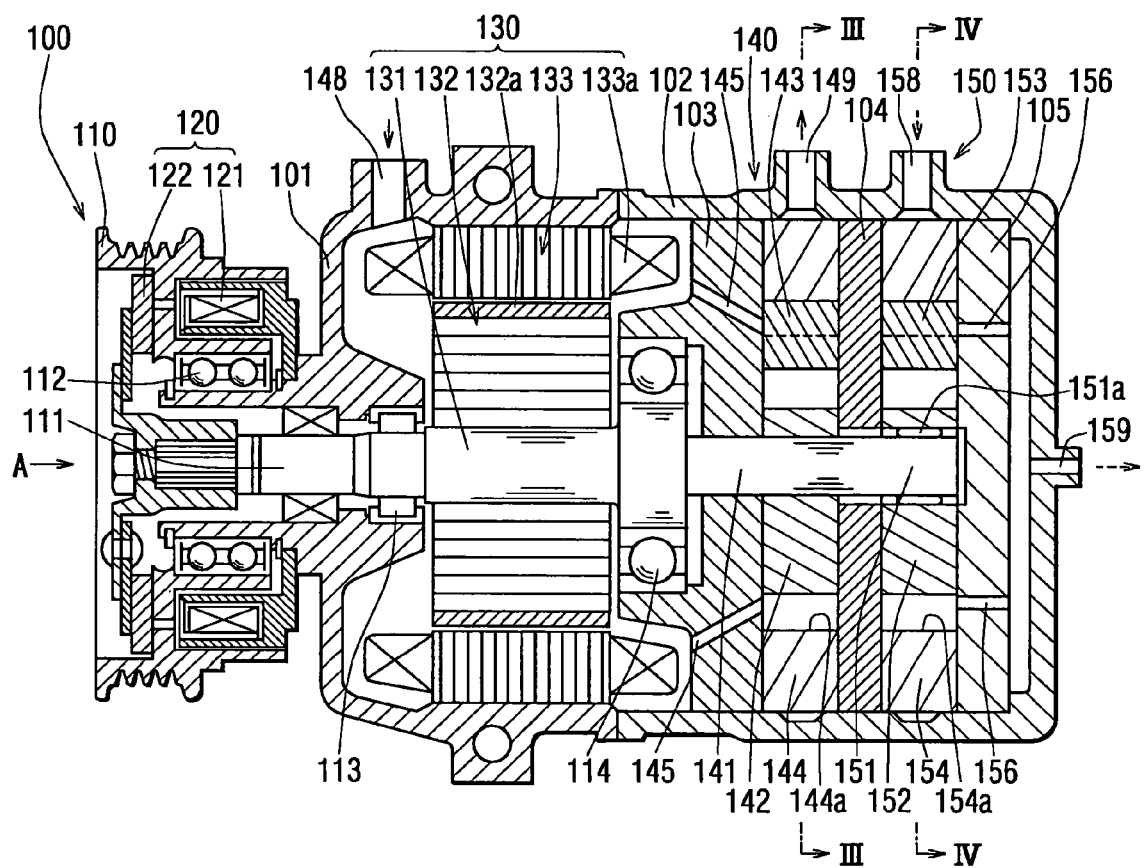
FIG. 2 is a cross-sectional view of a fluid machinery shown in FIG. 1.
Figure 3:
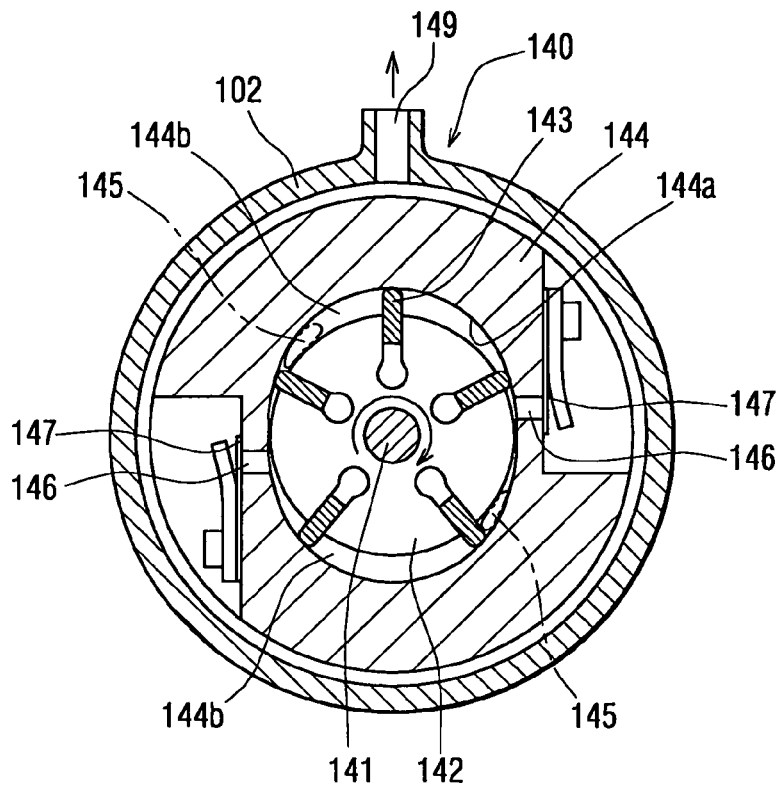
FIG. 3 is a cross-sectional view taken along a line III-III in FIG. 2.
Figure 4:
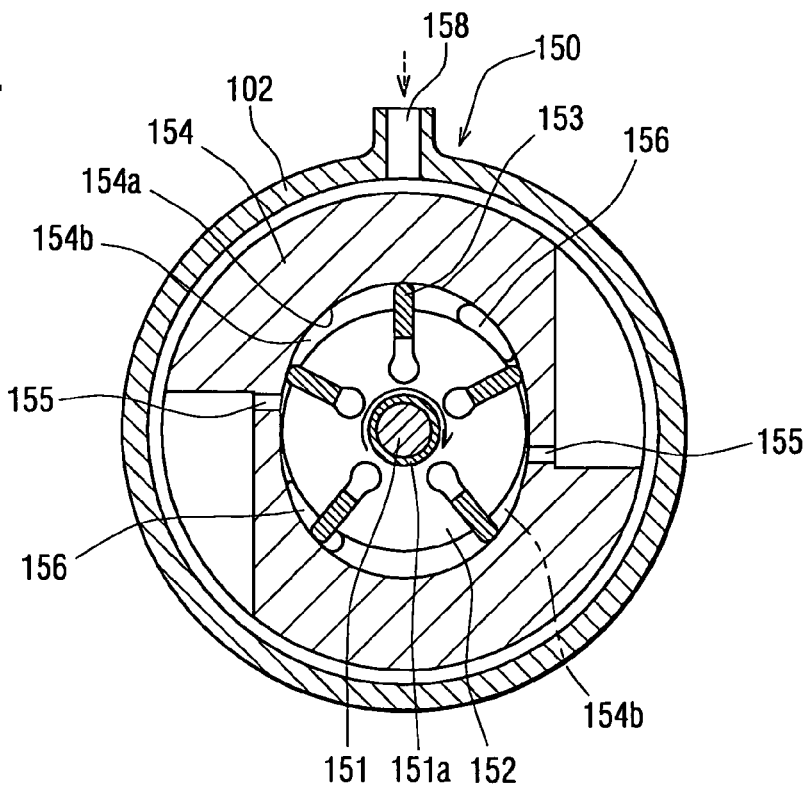
FIG. 4 is a cross-sectional view taken along a line IV-IV in FIG. 2.

As shown in FIGS. 2 and 3, a rotor 142 is fixed to a compressor shaft 141 and multiple vanes 143 (five vanes in this embodiment) are movably disposed in the rotor 142 in radial directions. The rotor 142 and vanes 143 are disposed in a cylindrical bore 144a of an oval configuration, which is formed in a housing 144, so that multiple working chambers 144b are formed by the rotor 142, vanes 143 and the cylindrical bore 144a. The compressor shaft 141 is connected coaxially to the motor shaft 131, namely to the driving shaft 111, and rotationally supported by the bearing 114.

Suction ports 145 (two ports) are provided in the partition wall 103 and a compressor inlet 148 provided in the front housing 101 of a pulley side and the working chambers 144b are connected with each other through the suction ports 145. Discharge ports 146 and discharge valves 147 (two ports and valves) are provided in the housing 144, and the working chambers 144b are connected to a compressor outlet 149 provided in the rear housing 102 through the discharge ports 146 and discharge valves 147. The compressor inlet 148 is connected to the evaporator 230, while the compressor outlet 149 is connected to the condenser 210.

In this compressor device 140, the driving force of the pulley 110 or the expansion device 150 explained later is transmitted to the compressor shaft 141, and the rotor 142 and the vanes 143 are rotated (in a clockwise direction in FIG. 3), so that refrigerant sucked through the compressor inlet 148 and the suction ports 145 is compressed in the working chambers 144b and then discharged from the compressor outlet 149 through the discharge ports 146 and the discharge valves 147. Since the refrigerant flows through the inside of the motor 130, cooling effect by the refrigerant at the motor can be obtained.

The expansion device 150 has a basic structure of the same vane-type to the compressor device 140 and is disposed in the rear housing 102 on a side of the compressor device 140 opposite to the pulley. The expansion device 150 is isolated from the compressor device 140 by an intermediate plate 104 in the rear housing 102. As shown in FIGS. 2 and 4, a rotor 152 has multiple vanes 153 (five vanes in this embodiment) and is fixed to an expansion device shaft 151. The rotor 152 and vanes 153 are disposed in a cylindrical bore 154a of an oval configuration, which is formed in a housing 154, so that multiple working chambers 154b are formed by the rotor 152, vanes 153 and the cylindrical bore 154a. The expansion device shaft 151 is connected coaxially to the compressor shaft 141, namely to the motor shaft 131 and the driving shaft 111, and rotationally supported by the bearing 114.

A one-way clutch 151a is provided between the expansion device shaft 151 and the rotor 152. When the rotor 152 is rotated (in a clockwise direction in FIG. 4), the one-way clutch 151a is engaged with the expansion device shaft 151. In other words, when the rotor 152 is in a state of non-rotation, the expansion device shaft 151 is free from the rotation in the clockwise direction.

An end plate 105 is provided on a side of the rotor 152 and the housing 154 opposite to the compressor device. Suction ports 155 (two ports) are provided in the housing 154 and an inlet 158 of the expansion device provided in the rear housing 102 and the working chambers 154a are connected with each other through the suction ports 155. Discharge ports 156 (two ports) are provided in the end plate 105, and the working chambers 154b are connected to an outlet 159 of the expansion device provided in the rear housing 102 through the discharge ports 156. The inlet 158 is connected to the heating device 330, while the outlet 159 is connected to the heat radiating device 310.

An operation of the above embodiment will now be explained.

(i) At First, an Operation of the Air-Conditioning Mode Will be Explained During which Waste Heat is Collected.

The control unit 160 operates the pump 320 of the waste heat collecting cycle 300. The electromagnetic clutch 120 is made to the on-state, during the engine 10 is running. Then, the driving force of the engine 10 will be transmitted from the pulley 110 to the driving shaft 111, the motor shaft 131 and the compressor shaft 141, so that the compressor device 140 is operated. Then, the refrigerant in the refrigerating cycle 200 will be compressed by the compressor device 140. And the air will be cooled down by the evaporator 230. In this operation, since the rotor portion 132 of the motor 130 is likewise rotated by the pulley 110, the motor 130 is operated as the electric power generator to generate electric power.

In the expansion device 150, the refrigerant of the superheated steam heated by the heating device 330 flows into the working chambers 154b through the inlet 158 and the suction ports 155 due to the operation of the pump 320. When the refrigerant of the superheated steam is expanded in the working chambers 154a, the rotor 152 is driven to rotate in the same rotational direction (the clockwise direction) of the compressor device 140 and the motor 130. The shaft 151 will be then engaged with the rotor 152 over the one-way clutch 151a and rotated together with the rotor 152. The driving force generated at the expansion device 150 is thus applied to the compressor device 140 and the motor (generator) 130.

When the engine operation is stopped due to an idle-stop signal, the control unit 160 makes the electromagnetic clutch 120 to an off-state, and starts the operation of the motor 130 as the electric motor. The compressor device 140 is then driven by the driving force of the motor 130, so that the air-conditioning operation becomes possible even during the engine 10 is stopped. In this operation, the expansion device 150 is continuing the rotation by the refrigerant of the superheated steam and the driving force is applied to the compressor device 140.

When the engine operation is stopped due to an idle-stop signal, however, when the driving force generated at the expansion device 150 is high enough to drive the compressor device 140 and the motor 130, the electromagnetic clutch 120 is kept at its off-state and the motor 130 will be then operated as the electric power generator by the driving force from the expansion device 140.

(ii) Secondly, an Operation of the Air-Conditioning Mode Will be Explained During which Waste Heat can not be Collected.

The control unit 160 stops the operation of the pump 320 of the waste heat collecting cycle 300. When the engine 10 is running, the electromagnetic clutch 120 is made to the on-state. Then, the compressor device 140 will be operated by the driving force from the engine 10 to carry out the air-conditioning operation. In this operation, since the rotor portion 132 of the motor 130 is likewise rotated, the motor 130 is operated as the electric power generator.

In this operation, since the pump 320 is stopped, the refrigerant of the superheated steam will not flow into the expansion device 140 and the rotor 152 remains at its no-rotation state. The shaft 151 will be disengaged from the rotor 152 over the one-way clutch 151a, so that the shaft 151 can be rotated without receiving restriction of the rotor 152.

When the engine operation is stopped due to an idle-stop signal, the control unit 160 makes the electromagnetic clutch 120 to the off-state, and starts the operation of the motor 130 as the electric motor. The compressor device 140 is, therefore, driven by the driving force of the motor 130, so that the air-conditioning operation becomes possible even during the engine 10 is stopped.

In this operation, the shaft 151 is kept in a disengaged condition from the rotor 152 over the one-way clutch 151*a*, so that the shaft 151 can be likewise rotated without receiving restriction of the rotor 152.

(iii) Thirdly, an Operation Mode Will be Explained, in Case that The Air-Conditioning Operation is not Necessary:

In this case, the control unit 160 stops the operation of the pump 320 of the waste heat collecting cycle 300, makes the electromagnetic clutch 120 to the off-state not to operate the motor 130, whether or not the waste heat can be collected, or whether or not the engine 10 is running.

According to the above mentioned structure and operation of the first embodiment of the present invention, the following effects can be obtained.

Since the expansion device 150 is connected to the motor 130 and to the compressor device 140, and the driving force from the expansion device 150 is additionally applied to the compressor device 140 or the motor (generator) 130, when the compressor device 140 is operated by the engine 10, the driving load for the engine 10 can be made smaller to achieve an improvement of fuel consumption ratio.

The driving force from the engine 10 can be selectively transmitted to the compressor device 140 over the electromagnetic clutch 120, so that the compressor device 140 can be operated by the motor 130 even during the engine 10 is stopped. Furthermore, since the driving force from the expansion device 150 can be applied to the compressor device 140 in the above situation, the driving force from the motor 130 can be decreased, so that a smaller size motor can be used.

Since the shaft 151 becomes out of the engagement from the rotor 152 of the expansion device 150 over the one-way clutch 115*a*, the motor shaft 131 and the compressor shaft 141 can be rotated without receiving restriction from the expansion device, when the expansion device 150 is not in an operation of waste heat collection.

Second Embodiment

Figure 5:
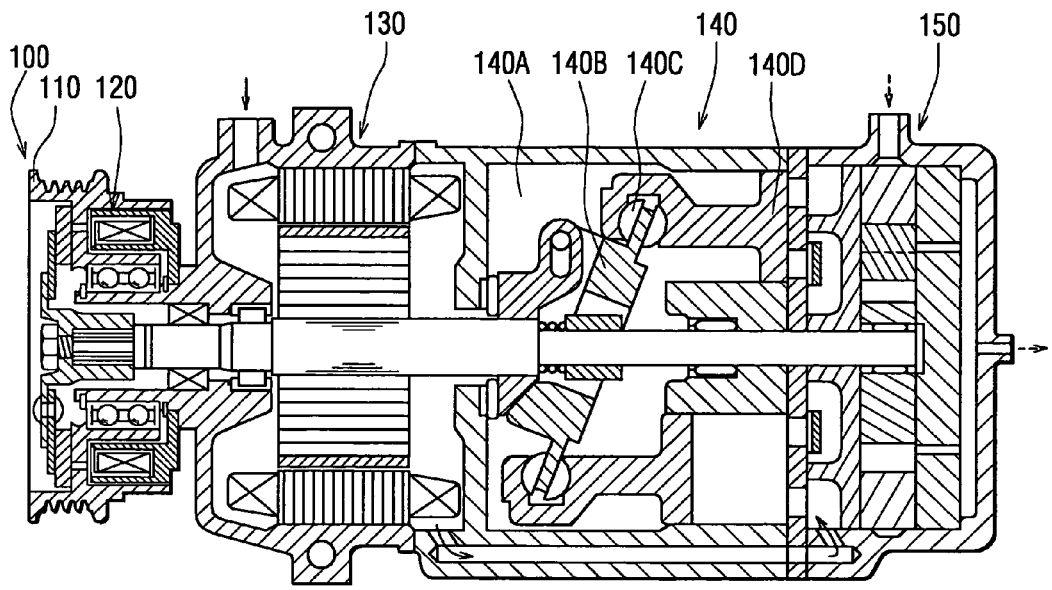
FIG. 5 is a cross-sectional view of a fluid machinery according to a second embodiment of the present invention.

In a second embodiment shown in FIG. 5, the compressor device 140 is changed to such a variable discharge type compressor, which can vary the discharge amount per rotation. More exactly, a well known swash plate type compressor is used for the compressor device 140. A swash plate 140B is disposed in a swash plate chamber 140A and operatively connected to a piston 140D via a shoe 140C provided at the periphery of the swash plate 140B. In this compressor, the pressure in the swash plate chamber 140A is controlled by the control unit 160, so that an inclination of the swash plate 140B can be changed to vary the stroke of the piston 140D. The discharge amount can be variable from its maximum amount to substantially zero.

In the air-conditioning operation, the compressor device 140 is operated so that the discharge amount is varied in response to cooling load, for example, the discharge amount will be made to substantially zero, when there is no requirement for the operation of the air-conditioning.

When the waste heat is collected during the engine 10 is running, the control unit 160 operates the pump 320 and makes the electromagnetic clutch 120 to the off-state and the motor 130 will be operated by the expansion device 150 as the electric power generator (In this operation, the compressor device 140 is idling). Alternatively, when the electromagnetic clutch 120 is made to the on-state, then the driving force of the expansion device 150 is applied to the pulley 110 while the motor 130 is operated as the generator.

When waste heat can not be collected, the operation of the pump 320 is stopped and the electromagnetic clutch 120 is made to the on-state so that the motor 130 is operated as the generator.

As the compressor device 140 is of the variable discharge type compressor in the above mentioned second embodiment, the restriction of the compressor device 140 can be minimized by adjusting the discharge amount to its minimum amount when the operation of the compressor device 140 is not necessary (in case of non-operation of the air-conditioning), and thereby the load for the electric power generation at the motor 130 by the expansion device 150 or the load for the engine 10 can be reduced. Furthermore, when the waste heat will not be collected, the electric power generation at the motor 130 by the engine 10 can be performed without receiving the restriction from the compressor device 140.

In the second embodiment, since the motor 130 can be operated as the electric power generator by minimizing the restriction of the compressor device 140 in case of non-operation of the air-conditioning, the fluid machinery 100 can effectively make use of the waste heat from the engine 10 throughout the year.

Third Embodiment

Figure 6:
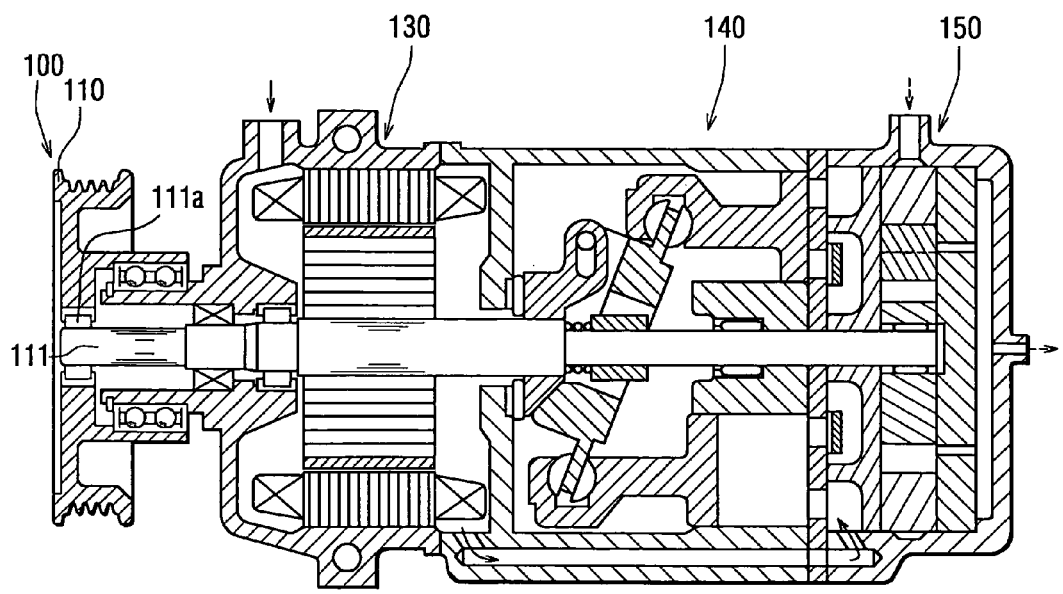
FIG. 6 is a cross-sectional view of a fluid machinery according to a third embodiment of the present invention.

The third embodiment of the present invention is shown in FIG. 6, in which the electromagnetic clutch 120 in the second embodiment is replaced by a one-way clutch 111*a*.

The one-way clutch 111*a* is provided between the pulley 110 and the driving shaft 111, so that the shaft 111 will become in engagement with the pulley 110 when the pulley is rotated in the normal rotational direction (in a clockwise direction). In other words, when the pulley 110 is not rotated due to the non-running of the engine 10, the driving shaft 111 is free from the rotation in the normal rotational direction.

Accordingly, when the engine 10 is running and the air-conditioner will be operated, the one-way clutch 111*a* operates in the same manner that the electromagnetic clutch 120 is in its on-state, so that the driving force of the engine 10 can be transmitted to the driving shaft 111. When the engine 10 is stopped, the one-way clutch 111*a* operates in the same manner that the electromagnetic clutch 120 is in its off-state (the driving shaft 111 becomes out of the engagement with the pulley 110), so that the compressor device 140 can be operated by the motor 130. As a result, it will be less expensive in the embodiment when compared with the use of the electromagnetic clutch 120.

Fourth and Fifth Embodiments

In the above first to third embodiments, both of the motor 130 and the compressor device 140 are provided in the fluid machinery 100. It is, however, either one of the motor 130 or the compressor device 140 can be taken away from the fluid machinery 100.

Figure 7:
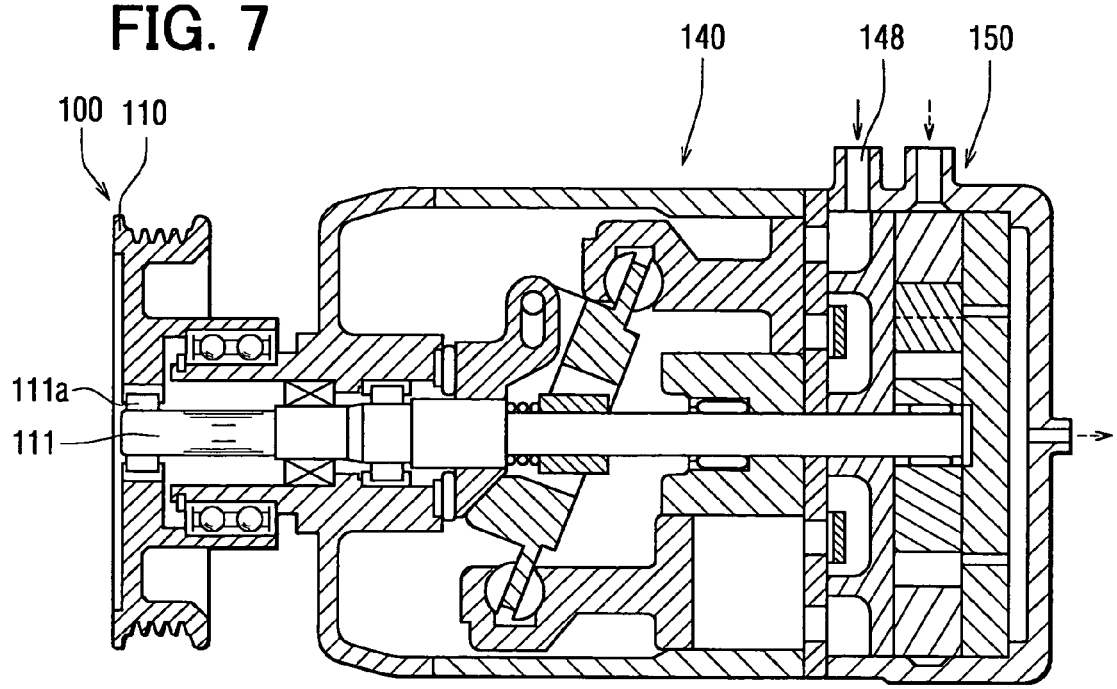
FIG. 7 is a cross-sectional view of a fluid machinery according to a fourth embodiment of the present invention.

In the fourth embodiment shown in FIG. 7, the motor is taken away and the compressor device 140 is provided in the fluid machinery 100. In this embodiment, the driving force of the expansion device 150 is applied to the compressor device 140 irrespectively whether there is requirement for the air-conditioning operation. Since the compressor device 140 can be operated by the expansion device 150 even during the engine is stopped at its idle-stop mode, the air-conditioning operation is possible at the idle-stop mode without consuming the electric power at the motor. In this operation, it may happen that the driving force from the expansion device 150 will be decreased and it may cause an improper operation of the compressor device 140 due to the shortage of the driving force. In such a case, the compressor device can be operated by adjusting the discharge amount to its smaller amount. Furthermore, since the one-way clutch 111a is provided to the pulley 110, the driving force of the expansion device 150 can be transmitted to the compressor device 140 without using the electromagnetic clutch, even when the compressor device 140 is operated by the engine 10 or when the engine is stopped at its idle-stop mode.

Figure 8:
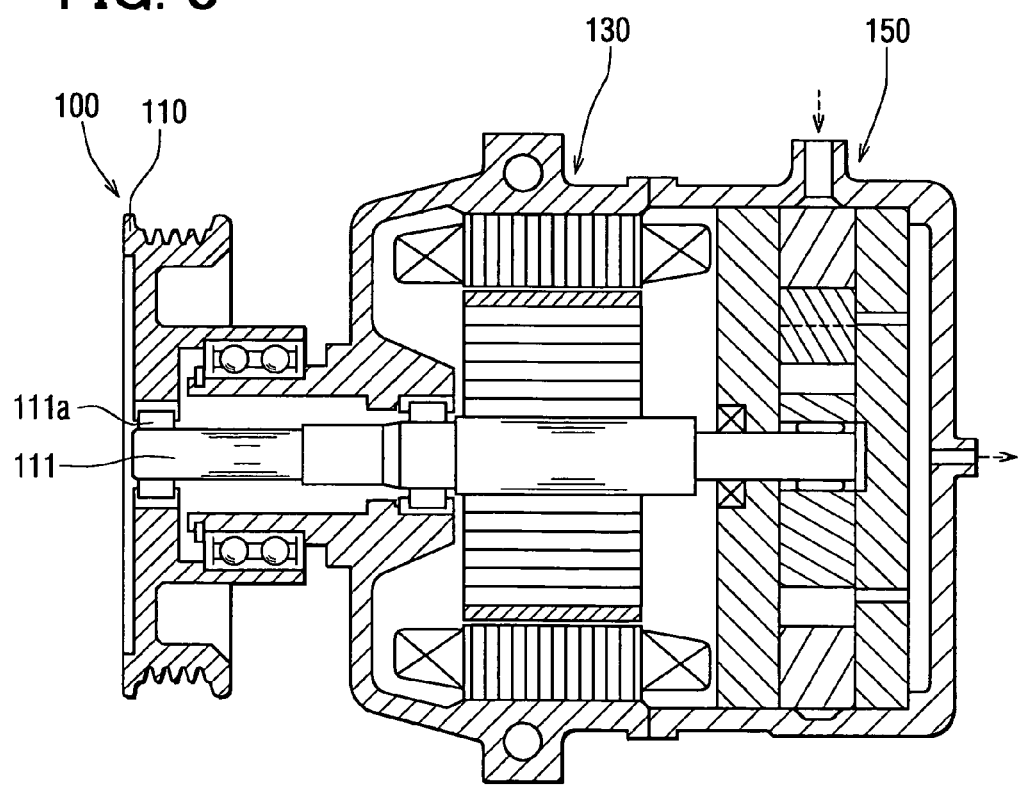
FIG. 8 is a cross-sectional view of a fluid machinery according to a fifth embodiment of the present invention.

In the fifth embodiment shown in FIG. 8, the motor 130 is provided in the fluid machinery 100. The embodiment differs from the third embodiment in that the compressor device is taken away. The driving force of the expansion device can be applied to the motor 130, even during the motor 130 is operated as the electric power generator by the engine 10. And the electric power generation is also possible by the driving force from the expansion device 140 when the engine 10 is stopped, so that it is effective to prevent a shortened life of the battery 20, which may be caused by the power consumption at the idle-stop mode of the engine.

In the embodiments shown in FIGS. 7 and 8, the one-way clutch 111a is used in place of the electromagnetic clutch to operate in the same manner of the electromagnetic clutch. When the driving force from the expansion device 150 is applied to the compressor device 140 during the engine 10 is running, and when it is preferable to operate the compressor device 140 at a more stable condition, then the electromagnetic clutch is more preferable than the one-way clutch.

Sixth Embodiment

Figure 9:
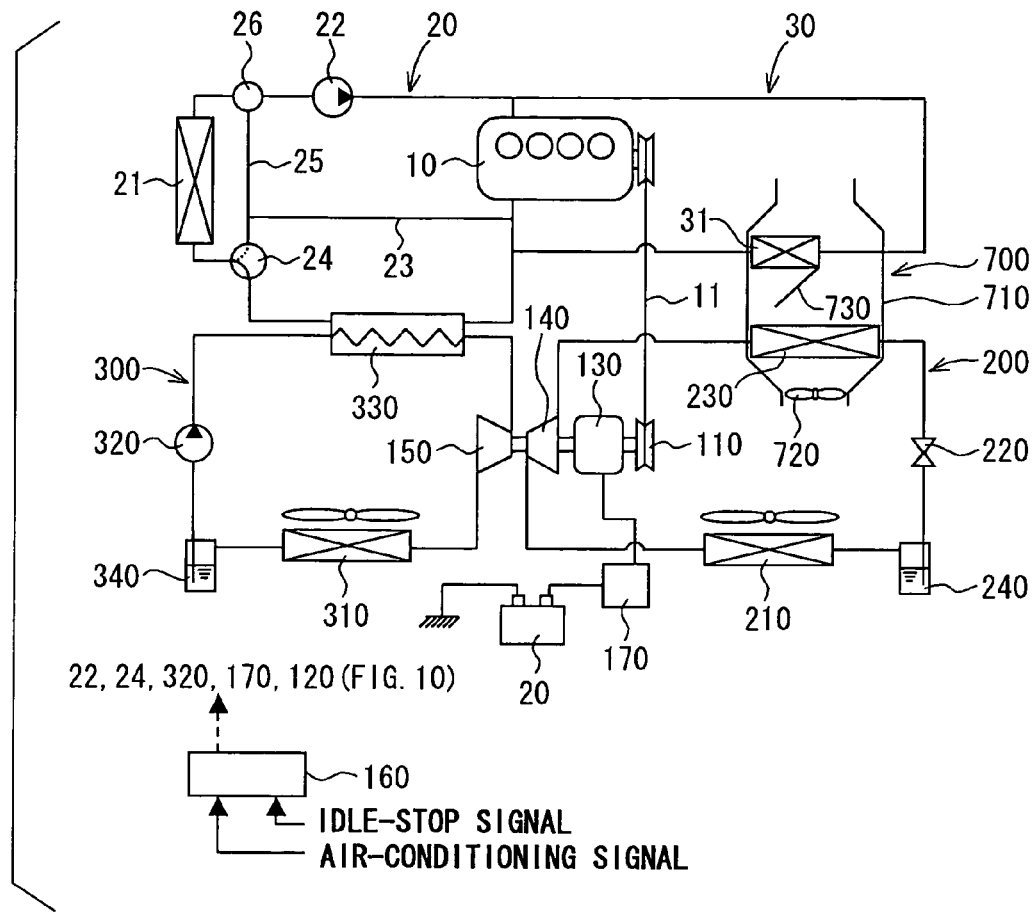
FIG. 9 is a schematic diagram showing a waste heat utilizing system according to a sixth embodiment of the present invention.
Figure 10:
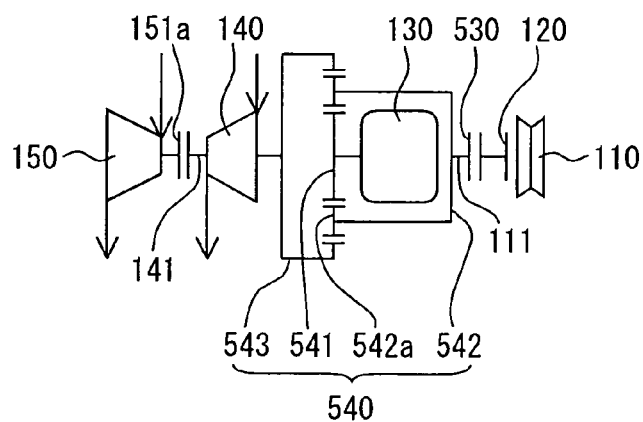
FIG. 10 is a schematic diagram showing connection of an expansion device, a compressor device, a pulley and an electric rotating machine shown in FIG. 9.

The sixth embodiment is shown in FIGS. 9 and 10, in which the same reference numerals designate the same components in the above first to fifth embodiments.

The internal combustion engine 10 is of a water cooled type and has a radiator circuit 20 for cooling the engine by circulating an engine coolant and a heater circuit 30 for heating air using the engine coolant as source of heat.

A radiator 21 is provided in the radiator circuit 20 and the radiator 21 cools down the engine coolant circulated by a water pump 22 through heat exchange between the engine coolant and the ambient air. The water pump 22 is the electrically-driven pump in this embodiment. An outlet port of the engine 10 is connected to the heating device 330 of Rankine cycle. A bypass passage 23 is provided and a passage of the engine coolant is selectively formed by a three-way valve 24, so that either of the passage for the heating device 330 or the bypass passage 23 is opened. A radiator bypass passage 25 through which the engine coolant flows and bypasses the radiator 21 is further provided in the radiator circuit 20, and a thermostat 26 controls the amount of the engine coolant flowing through the radiator 21 and bypass passage 25.

A heater core 31 is provided in the heater circuit 30 and the engine coolant (hot water) flows through the heater core 31 by the operation of the water pump 22. The heater core 31 is disposed in a casing 710 of an air-conditioning unit 700, and a blower fan 720 blows air to the heater core 31, so that the air is heated through heat exchange between the hot water and the air. An air-mix door 730 is provided to the heater core 31 and the amount of the air flowing through the heater core 31 is controlled by an opening degree of the air-mix door 730.

The waste heat collecting cycle 300 in this embodiment further comprises a receiver 340, in addition to the heating device 330, the expansion device 150, the condenser 310, and the pump 320. The receiver 340 divides the working fluid in the cycle, which is condensed by the condenser 310, into liquid and gas phases and discharges the working fluid of the liquid phase to the pump 320.

The refrigerating cycle 200 in this embodiment further comprises a receiver 240 in addition to the compressor device 140, the condenser 210, the expansion valve 220 and the evaporator 230. The compressor device 140 in this embodiment is a fixed displacement compressor. The receiver 240 divides the refrigerant, which is condensed by the condenser 210, into liquid and gas phases and discharges the refrigerant of the liquid phase to the expansion valve 220.

The evaporator 230 is disposed in the casing 710 and the air cooled down by the evaporator 230 and the air heated by the heater core 31 are mixed, the mixing ratio of which is controlled by the opening degree of the air-mix door 730, so that the temperature of the mixed air is controlled at a temperature set up by a passenger.

The compressor device 140, the pulley 110 and the electric rotating machine (motor) 130 are connected to a planet gear 540 operating as a power transfer unit. The planet gear 540 comprises, as well known, a sun gear 541 provided at its center, a planetary gear 542 connected to pinion gears 542a moving around the sun gear 541 and rotating at its own axis, and a ring gear 543 of a ring form provided at an outer periphery of the pinion gears 542a.

In this embodiment, the compressor device 140 is connected to the ring gear 543, the pulley 110 is connected to the planetary gear 542, and the electric rotating machine (motor) 130 is connected to the sun gear 541. A one-way clutch 530 is provided on the driving shaft 111 between the pulley 110 and the planet gear 540 (the planetary gear 542). The one-way clutch 530 will be engaged with the driving shaft 111 and drives the same when the pulley 110 is rotated. On the other hand, when the pulley is not rotated, the driving shaft 111 is free from the rotation in a direction of the operational direction of the pulley.

The control unit 160 receives the air-conditioner control signal, the idle-stop control signal and so on, and in accordance with those signals the control unit 160 controls the water pump 22, three-way valve 24, the pump 320, the supply of the electric energy to the electric rotating machine 130 via the inverter 170 or the electric power charge from the electric rotating machine 130, the ON-OFF control of the electromagnetic clutch 120, and so on.

An operation of the above embodiment will now be explained.

(i) A Normal Operation Mode of the Refrigerating Cycle:

This is the operational mode of air-conditioning, in which an air-conditioner is operated shortly after the engine started and therefore the temperature of the engine coolant is not sufficiently high (e.g. higher than 80 degrees Celsius).

The control unit 160 operates the water pump 22 of the radiator circuit 20 and the three-way valve 24 so that the bypass passage 23 for the engine coolant is opened. The operation of the pump 320 is stopped and the waste heat collecting cycle remains at its non-operation state. The electromagnetic clutch 120 is made to the on-state.

The driving force is then transmitted from the engine 10 to the compressor device 140 via the pulley 110 and the planet gear 540, so that the compressor 140 starts to run and the refrigerating cycle 200 will be operated.

In this operation, when the electric rotating machine 130 is operated as the electric motor, the driving force from the engine 10 and the driving force of the motor 130 can be applied in multiple manners to the compressor 310 by means of the power transmitting unit of the planet gear 540. Namely, when the motor 130 is rotated at a higher speed, then the rotational speed of the compressor device 140 will become lower than that of the pulley 110. On the other hand, when the motor 130 is rotated at a lower speed, then the rotational speed of the compressor device 140 will be higher than that of the pulley 110. As above, the control of the discharging amount of the refrigerant can be achieved in accordance with the cooling load.

When the supply of the electric power via the inverter 170 is cut off to stop the rotation of the motor 130, the compressor device 140 will be solely operated by the driving force from the pulley 110. Furthermore, when the motor 130 is rotated in a reverse direction, the compressor device 140 can be operated at a much higher rotational speed. When the supply of the electric power to the electromagnetic clutch 120 is cut off and the motor 130 is rotated in the reverse direction, the pulley shaft 111 will be locked by the one-way clutch 530, so that the driving force can be solely applied to the compressor device 140.

(ii) An Operational Mode of the Refrigerating Cycle by use of the Waste Heat Collecting Cycle:

This is the operational mode of the air-conditioning, in which the waste heat collecting cycle 300 is operated at such a condition that there is enough waste heat from the engine 10, and the driving force obtained therefrom will be applied to the compressor device 140 to operate the refrigerating cycle 200.

The control unit 160 operates the water pump 22 of the radiator circuit 20 and the three-way valve 24 so that the passage for the engine coolant through the heating device 330 is opened. The operation of the pump 320 is started and the waste heat collecting cycle starts to operate. The supply of the electric power to the electromagnetic clutch 510 is cut off, and the operation of the electric rotating machine 130 is stopped.

(iii) A Multiple Operational Mode of the Refrigerating Cycle and the Waste Heat Collecting Cycle:

This is the operational mode of the air-conditioning, in which the compressor device 140 is operated in the multiple manners by the driving force of the expansion device 150 and the driving force from the engine 10 or the electric rotating machine 130, when the cooling load is very high in summer even though there is high amount of the waste heat from the engine 10.

The control unit 160 operates the water pump 22 of the radiator circuit 20 and the three-way valve 24 so that the passage for the engine coolant through the heating device 330 is opened. The operation of the pump 320 is started and the waste heat collecting cycle starts to operate. The electric power is supplied to the electromagnetic clutch 510, while the operation of the electric rotating machine 130 is stopped.

Then the driving force from the engine 10 is applied to the compressor device 140 in addition to the driving force of the expansion device 150, so that the discharge amount of the refrigerant will be increased to enhance a cooling performance.

When it is required to further enhance the cooling performance, the control unit 160 operates the electric rotating machine (motor) 130 so that the driving force of the motor 130 will be further added to the compressor device 140. In this case, the electric rotating machine 420 is rotated in the reverse direction to the rotational direction of the pulley 110, so that the rotational speed of the compressor device 140 will be increased via the planet gear 540.

It is also possible that the compressor device 140 will be operated by the driving force of the expansion device 150 and the driving force of the electric rotating machine (motor) 130, in which the supply of the electric power to the electromagnetic clutch 510 is cut off and the electric rotating machine (motor) 130 is rotated in the reverse direction. In this operation, the driving shaft 111 is locked due to the one-way clutch 530, so that the driving force of the electric rotating machine (motor) 130 can be added to the compressor device 140.

(iv) An Operational Mode of the Refrigerating Cycle During the Engine is Stopped:

This is the operational mode of the air-conditioner, in which the engine 10 is stopped because of a so-called idle-stop function but the compressor device 140 is operated by the expansion device 150.

The control unit 160 operates the water pump 22 of the radiator circuit 20 and the three-way valve 24 so that the passage for the engine coolant through the heating device 330 is opened. The operation of the pump 320 is started and the waste heat collecting cycle starts to operate. The supply of the electric power to the electromagnetic clutch 510 is cut off, and the operation of the electric rotating machine 130 is stopped.

The compressor device 140 is operated by the driving force of the expansion device 150. It is, however, further, possible to drive the compressor device 140 by the driving forces from the expansion device 150 and the electric rotating machine (motor) 130, when the motor 130 is rotated in the reverse direction in dependent on the cooling load.

When the waste heat collecting cycle 300 is kept operating while the engine 10 is stopped, the temperature of the engine coolant is decreased, causing a problem of decrease of fuel consumption ratio at the re-starting of the engine. Accordingly, when the temperature of the engine coolant is decreased to a temperature lower than a predetermined amount (e.g. 80 degrees Celsius), the control unit 160 stops the operation of the waste heat collecting cycle 300 (the pump 320) and starts the rotation of the motor 130 in the reverse direction so as to drive the compressor device 140. In this operation, the shaft 141 is disengaged from the expansion device because of the one-way clutch 151*a*, so that the driving force of the motor 130 can be applied to the compressor device 140 without receiving any resistance from the expansion device 150.

(v) An Operational Mode of the Refrigerating Cycle by Use of the Waste Heat Collecting Cycle and Collection of Energy:

This is the operational mode of the air-conditioner, in which the excess amount of the driving force obtained by the waste heat collecting cycle 300 is applied to the engine 10 or used for generating electric power at the electric rotating machine 130, when the cooling load is relatively low during spring or autumn.

The control unit 160 operates the water pump 22 of the radiator circuit 20 and the three-way valve 24 so that the passage for the engine coolant through the heating device 330 is opened. The operation of the pump 320 is started and the waste heat collecting cycle starts to operate. The electric power is supplied to the electromagnetic clutch 510, and the electric rotating machine 130 is operated as the electric power generating machine.

A portion of the driving force from the expansion device 150 is transmitted to the compressor device 140 in proportion to the cooling load and the excess amount of the driving force from the expansion device 150 is supplied to the pulley 110 and the electric rotating machine 130, so that in addition to the operation of the compressor device 140, the driving force of the engine 10 can be reduced and at the same time the generation of the electric power at the electric rotating machine 130 becomes possible.

According to the above mentioned structure and operation of the embodiment, the following effects can be obtained.

As the waste heat collecting cycle 300 is provided independently of the refrigerating cycle 200, the expansion device 150 can be operated irrespectively of the operation or non-operation of the refrigerating cycle 200, and as the compressor device 140 is operated by the driving force from the expansion device 150 it becomes possible to decrease the driving load of the engine 10 and thereby to increase the fuel consumption ratio.

Furthermore, since the compressor device 140 is solely operated by the driving force of the expansion device 150, without using the energy from the engine 10 or the battery 20, depending on the cooling load, or since excess amount of the driving force from the expansion device 150, which is excess for driving the compressor device 140, is applied to the pulley 110 or the electric rotating machine 130, the operational force for the engine 10 can be reduced and the generation of the electric power at the electric rotating machine 130 becomes possible.

Since the one-way clutch 151a is provided between the expansion device 150 and the compressor device 140, the compressor device 140 can be operated by the energy from the engine 10 (the pulley 110), the battery 20 (the electric rotating machine 130) and so on, without receiving any restriction of the expansion device 150, when the operation of the waste heat collecting cycle 300 is stopped.

Furthermore, since the planet gear 540 serving as the power transmitting unit is interposed between the compressor device 140, the pulley 110 and the electric rotating machine 130, the rotational speed of the compressor device 140 can be controllable by adjusting the rotational speed of the electric rotating machine 130, and therefore the discharge amount of the refrigerant can be made variable even when the compressor device 140 of the fixed discharge type is used.

In a case that a compressor of a variable discharge type is used and the amount of the discharge from the compressor is controlled at zero by the control unit 160 when the operation of the air-conditioner is not necessary, then an additional operational mode (vi) of collecting the energy can be possible in addition to the above mentioned operational modes (i) through (v).

More exactly, the discharge amount of the compressor device 140 is made substantially zero by the control unit 160 and the electric power supply to the electromagnetic clutch 510 is cut off. Then, the driving force of the expansion device 150 is transmitted to the electric rotating machine 130 without any restriction from the compressor device 140 and the generation of the electric power at the electric rotating machine 130 can be fully done. When the electric power is supplied to the electromagnetic clutch 510, the transmission of the driving force to the engine 10 can be possible while the electric power is generated at the electric rotating machine 130.

Seventh Embodiment

Figure 11:
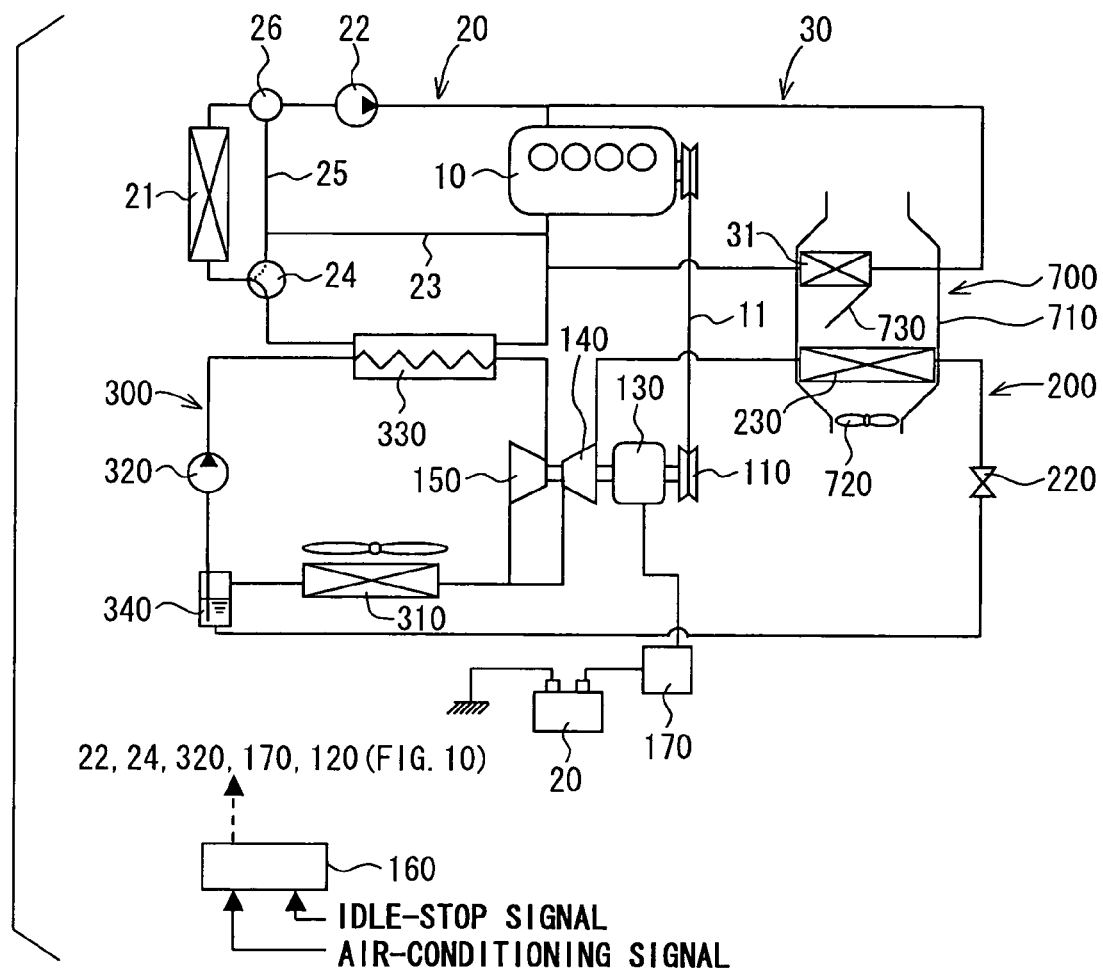
FIG. 11 is a schematic diagram showing a waste heat utilizing system according to a seventh embodiment of the present invention.

The seventh embodiment according to the present invention is shown in FIG. 11, in which the same fluid for the refrigerating cycle 200 is used as the working fluid for the waste heat collecting cycle 200 and the condenser 210 is taken away from the refrigerating-cycle 200, so that the condenser 310 of the waste heat collecting cycle 300 is also used as the condenser for the refrigerating cycle.

According to this embodiment, the waste heat utilizing system 100 can be made less expensive, although the driving force obtained by the expansion device 150 will be decreased while the driving force for the compressor device 140 will be increased.

Eighth Embodiment

Figure 12:
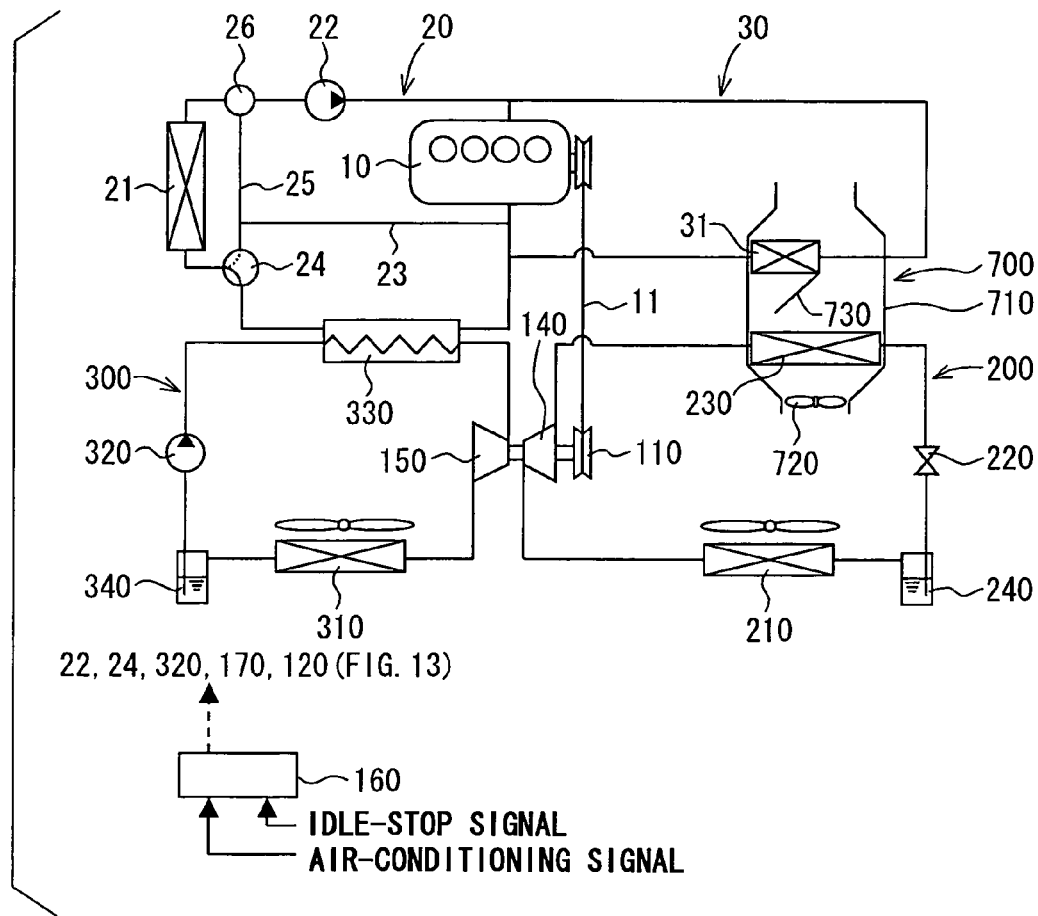
FIG. 12 is a schematic diagram showing a waste heat utilizing system according to an eighth embodiment of the present invention.
Figure 13:
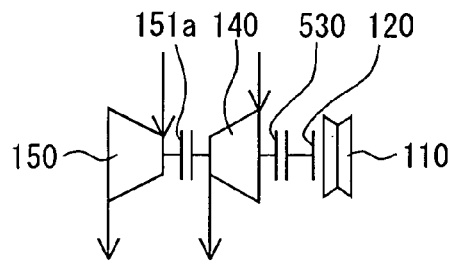
FIG. 13 is a schematic diagram showing connection of an expansion device, a compressor device and a pulley of FIG. 12.

The eighth embodiment according to the present invention is shown in FIGS. 12 and 13, in which the electric rotating machine 130 and the planet gear 540 are taken away from the sixth embodiment shown in FIGS. 9 and 10. The inverter 170 and the battery 20 are also taken away from the waste heat utilizing system 100. The variable discharge type compressor 140 is used in place of the fixed discharge type compressor, in which the discharge amount is controlled by the control unit 160.

The expansion device 150 is connected to the compressor device 140 via the one-way clutch 120, while the compressor device 140 is connected to the pulley 110 via the one-way clutch 530 and the electromagnetic clutch 120.

As the electric rotating machine 130 is taken away in this embodiment, the operational mode of the electric power generation at the motor 130 and the supply of the driving force from the motor 130 to the compressor device 140 are no longer existing, when compared with the operational modes of the sixth embodiment. Namely, "the operational mode (v) of the refrigerating cycle by use of the waste heat collecting cycle and the collection of energy" will become "an operational mode (vii) of the refrigerating cycle by use of the waste heat collecting cycle and an engine assist". Further, "the operational mode (vi) of collecting the energy" will be "an operational mode (viii) of an engine assist", wherein the driving force generated at the expansion device 150 is applied to the compressor device 140 and to the engine 10, so that the fuel consumption ratio of the engine 10 is achieved.

Ninth Embodiment

Figure 14:
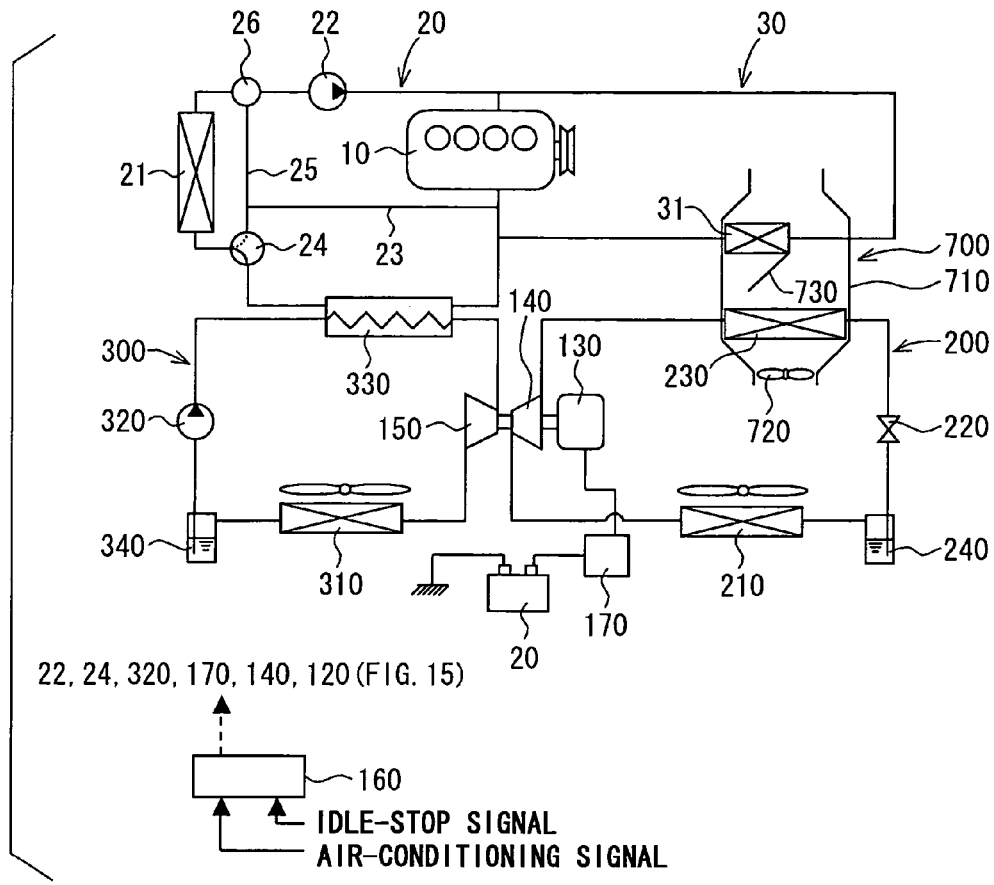
FIG. 14 is a schematic diagram showing a waste heat utilizing system according to a ninth embodiment of the present invention.
Figure 15:
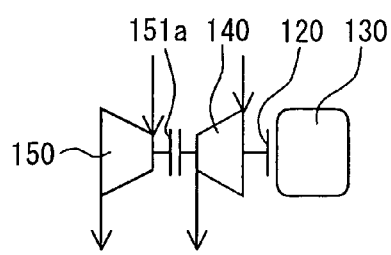
FIG. 15 is a schematic diagram showing connection of an expansion device, a compressor device and an electric rotating machine of FIG. 14.
Figure 16:
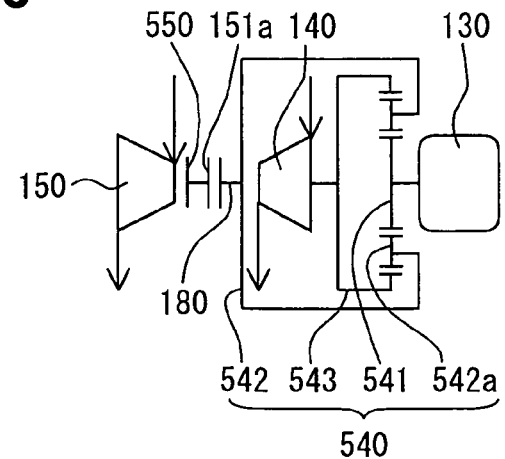
FIG. 16 is a schematic diagram showing connection of an expansion device, a compressor device and an electric rotating machine according to a tenth embodiment of the present invention.

The ninth embodiment according to the present invention is shown in FIGS. 14 and 15, wherein the pulley 110 (the belt 11), the one-way clutch 530 and the planet gear 540 are taken away from the sixth embodiment. The variable discharge type compressor 140 is used in place of the fixed discharge type compressor, in which the discharge amount is controlled by the control unit 160.

The expansion device 150 is connected to the compressor device 140 via the clutch 151a, while the compressor device 140 is connected to the electric rotating machine 130 via the electromagnetic clutch 120.

Since the pulley 110 is not provided in this embodiment, the transmission of the driving force to the compressor device 140 via the pulley or of the driving force from the expansion device 150 to the engine 10 is not existing, when compared with the operational modes of the sixth embodiment.

It is, however, possible to decrease the driving force generated at the electric rotating machine 130 for driving the compressor device 140, because the driving force generated at the expansion device 150 can be applied to the compressor device 140. Further, a major part of the driving force of the expansion device 150 can be applied to the electric rotating machine 130, when the discharge amount of the compressor device 140 is small, so that a sufficient charge of the electric power can be achieved. As above, the operation of the compressor device 140 and the electric power generation at the electric rotating machine 130 can be done without using the output power from the engine 10.

Tenth Embodiment

The tenth embodiment of the present invention is shown in FIG. 8, wherein the planet gear 540 serving as the power transmission unit is provided between the expansion device 150, the compressor device 140 and the electric rotating machine 130, when compared with the above ninth embodiment. The expansion device 150 is connected to the planetary gear 542 of the planet gear 540, the compressor device 140 is connected to the ring gear 543 and the electric rotating machine 130 is connected to the sun gear 541. An electromagnetic clutch 550 and the one-way clutch 151a are interposed on a shaft 180 and between the expansion device 150 and the planetary gear 541. The compressor device 140 is of the fixed discharge type. The tenth embodiment operates in the following operational modes.

(i) A Normal Operation Mode of the Refrigerating Cycle:

The control unit 160 cuts off the supply of the electric power to the electromagnetic clutch 550 and drives the electric rotating machine 130 in a rotational direction reversed to the rotational direction of the compressor device 140. Then, the shaft 180 is locked because of the one-way clutch 151a and thereby the compressor device 140 will be rotated by the driving force from the electric rotating machine 130. The rotational speed of the compressor device 140 can be varied by adjusting the rotational speed of the electric rotating machine 130.

(ii) An Operational Mode of the Refrigerating Cycle by Use of the Waste Heat Collecting Cycle:

The control unit 160 supplies the electric power to the electromagnetic clutch 550 and stops the operation of the electric rotating machine 130. Then, the driving force of the expansion device 150 will be transmitted to the compressor device 140 via the planet gear 540, and the compressor device 140 starts to operate.

(iii) A Multiple Operational Mode of the Refrigerating Cycle and the Waste Heat Collecting Cycle:

The control unit 160 supplies the electric power to the electromagnetic clutch 550 and operates the electric rotating machine 130. Then, the compressor device 140 will be driven by the driving forces from the expansion device 150 and the electric rotating machine 130, so that the compressor device can operate even at a high cooling load. In particular, when the rotational speed of the electric rotating machine 130 is controlled at a lower speed than that of the expansion device 150, the rotational speed of the compressor device 140 can be increased to increase the discharge of the refrigerant.

(iv) An Operational Mode of the Refrigerating Cycle During the Engine is Stopped:

The control unit 160 supplies the electric power to the electromagnetic clutch 550 and stops the operation of the electric rotating machine 130, so that the compressor device 140 is operated by the driving force of the expansion device 150. On the other hand, when the temperature of the engine coolant becomes lower than a predetermined value, the supply of the electric power to the electromagnetic clutch 550 will be cut off and the electric rotating machine 130 will be operated to rotate in the reversed direction, so that the compressor device 140 will be operated by the driving force of the electric rotating machine 130. This is the same to the normal operational mode of the refrigerating cycle of the above mentioned mode (i).

(v) An Operational Mode of the Refrigerating Cycle by Use of the Waste Heat Collecting Cycle and Collection of Energy:

The control unit 160 supplies the electric power to the electromagnetic clutch 550 and operates the electric rotating machine 130 as the electric power generating machine. Then, it makes possible to generate the electric power while the compressor device 140 is operated by the driving force of the expansion device 150.

(vi) An Operational Mode of Collecting the Energy:

The control unit 160 controls the electric rotating machine 130 in such a manner that the rotational speed of the compressor device 130 comes down almost to zero, while the rotational speed of the electric rotating machine 130 will be instead increased to generate the electric power.

As above, in the tenth embodiment, since the discharge amount of the refrigerant can be varied by adjusting the rotational speed of the compressor device 140 by means of the planet gear 540, the compressor of the fixed discharge type can be used, when compared with the ninth embodiment, so that the system can be made less expensive.

Eleventh Embodiment

Figure 17:
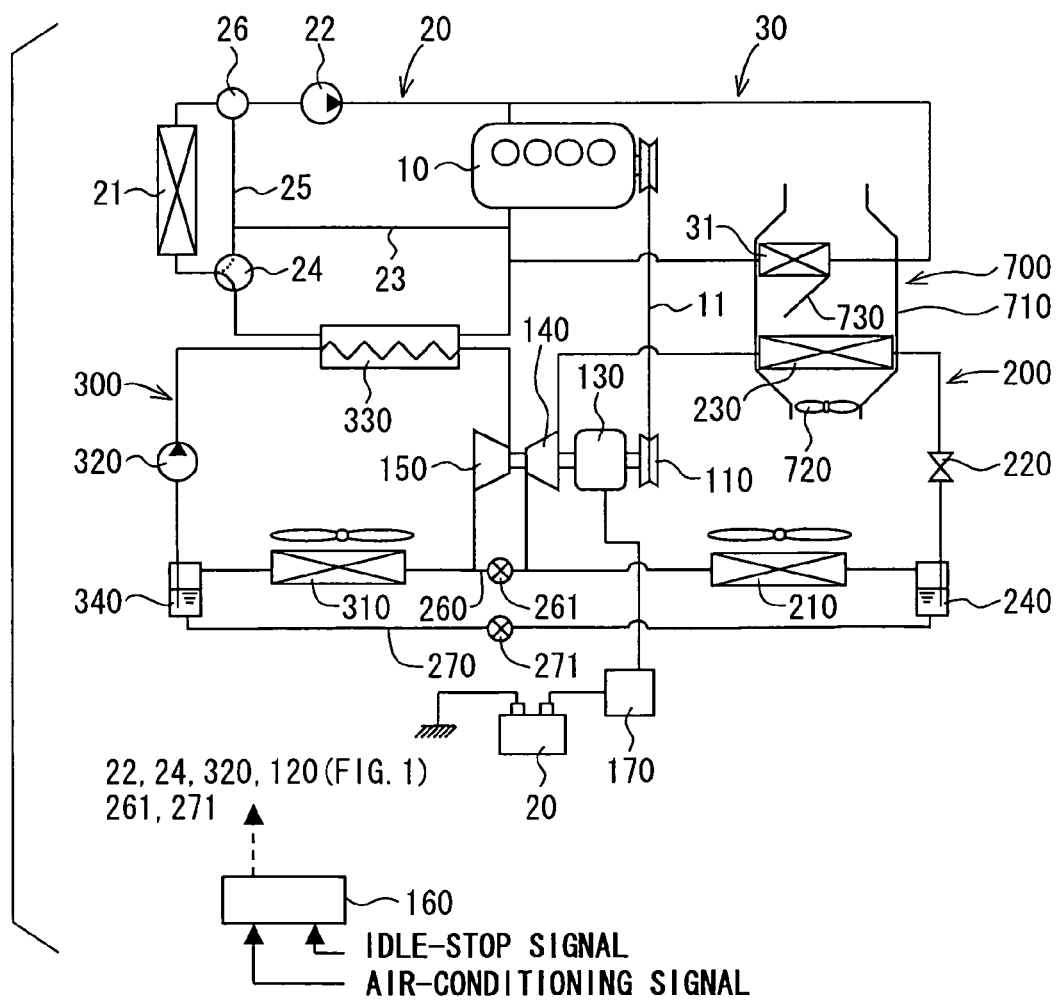
FIG. 17 is a schematic diagram showing a waste heat utilizing system according to an eleventh embodiment of the present invention.

The eleventh embodiment of the present invention is shown in FIG. 17, wherein the working fluid in the waste heat collecting cycle 300 is selected to be the same fluid to the refrigerant of the refrigerating cycle 200, and connecting passages 260 and 270 are provided between the condenser 310 of the waste heat collecting cycle 300 and the condenser 210 of the refrigerating cycle 200.

The connecting passage 260 connects inlets of both condensers 310 and 210 with each other, and an electromagnetic valve (valve) 261 is provided so as to open and/or close the connecting passage 260. The connecting passage 270 connects outlets of both condensers 310 and 210 with each other, and an electromagnetic valve (valve) 271 is provided so as to open and/or close the connecting passage 270. The valves 261 and 271 are controlled by the control unit 160.

The control unit 160 opens the electromagnetic valves 261 and 271, when the waste heat collecting cycle 300 will be alone operated in case of the operational mode of collecting the energy in which no requirement for the air-conditioning operation is existing, or when the refrigerating cycle 200 will be alone operated in case of the normal operational mode of the refrigerating cycle 200. And then, both of the condensers 310 and 210 of the respective cycles 200 and 300 are commonly used.

According to the above embodiment, the outlet pressure of the expansion device 150 can be made lower in case of the single operation of the waste heat collecting cycle 300, so that the driving force generated at the expansion valve can be increased. Further, the outlet pressure of the compressor device 140 can be made lower in case of the single operation of the refrigerating cycle 200, so that the driving force for the compressor device 140 can be decreased.

Other Embodiments

The present invention is explained in the above embodiments, in which the invention is applied to an automotive vehicle having an idle-stop function. The present invention, however, can be used for a hybrid vehicle which has a motor for running the vehicle and in which an operation of an internal combustion engine will be stopped during a predetermined running condition, even during the vehicle is running. The present invention can be used for the hybrid vehicle, in which the operation of the engine will not be stopped.

The compressor device shall not be limited to the vane type of the fixed discharge type, and other types of rotary type, scroll type and so on can be used as the compressor device.

The pump 320 of the waste heat collecting cycle 300 is explained as an electric type pump. It is, however, possible that such a pump, which is driven by the driving force of the expansion device 150, can be used. In this modification, the collected energy can be further used in the multiple manners.

What is claimed is:

1. A waste heat utilizing system for an automotive vehicle comprising:
   a waste heat collecting cycle for collecting waste heat from an internal combustion engine and having an expansion device for generating rotational driving force from the collected waste heat;
   a refrigerating cycle having a compressor device for compressing a refrigerant; and
   a power transmitting means driven by an outside driving source and operatively connected to the compressor device to rotationally drive the same, wherein
   the expansion device is operatively connected to the compressor device to rotationally drive the same,
   the waste heat collecting cycle has the expansion device, a condenser, an electrically-driven refrigerant pump, and a heating device,
   the internal combustion engine is water-cooled and has a passage of the engine coolant for the heating device and an electrically-driven water pump being placed in the passage to supply the engine coolant to the heating device, and
   the waste heat utilizing system further comprises a control unit which operates both the electrically-driven water pump and the electrically-driven refrigerant pump to operate the waste heat collecting cycle when the internal combustion engine is stopped.

2. A waste heat utilizing system according to claim 1, wherein the outside driving source is the internal combustion engine.

3. A waste heat utilizing system according to claim 2, further comprising an on-and-off means provided between the power transmitting means and the compressor device for intermittently transmitting the driving force from the power transmitting means to the compressor device.

4. A waste heat utilizing system according to one of claim 1, claim 2, and claim 3, further comprising a one-way clutch provided between the expansion device and the compressor device for transmitting the driving force from the expansion device to the compressor device.

5. A waste heat utilizing system according to one of claim 1, claim 2, and claim 3, further comprising a one-way clutch provided between the power transmitting means and the compressor device for transmitting the driving force from the power transmitting means to the compressor device.

6. A waste heat utilizing system according to one of claim 1, claim 2, and claim 3, further comprising an electric rotating machine which can be operated as both an electric motor and an electric power generator, wherein the electric rotating machine is operatively connected to the compressor device.

7. A waste heat utilizing system for an automotive vehicle comprising:
   a waste heat collecting cycle for collecting waste heat from an internal combustion engine and having an expansion device for generating rotational driving force from the collected waste heat;
   a refrigerating cycle having a compressor device for compressing a refrigerant; and
   a power transmitting means driven by an outside driving source and operatively connected to the compressor device to rotationally drive the same, wherein
   the expansion device is operatively connected to the compressor device to rotationally drive the same,
   the waste heat collecting cycle has the expansion device, a condenser, an electrically-driven refrigerant pump, and a heating device,
   the internal combustion engine is water-cooled and has a passage of the engine coolant for the heating device and an electrically-driven water pump being placed in the passage to supply the engine coolant to the heating device, and
   the waste heat utilizing system further comprises a control unit which operates both the electrically-driven water pump and the electrically-driven refrigerant pump to operate the waste heat collecting cycle when the internal combustion engine is stopped.

8. A waste heat utilizing system according to claim 7, wherein the power transmitting means comprises at least one of the following components:
   a pulley operatively connected to the internal combustion engine and rotationally driven by the same; and
   an electric rotating machine having both functions of an electric motor for generating a rotational driving force and an electric power generator for generating electric power when driven by the outside driving source.

9. A waste heat utilizing system according to claim 8, wherein the expansion device is operatively connected to the electric rotating machine of the power transmitting means, and the electric rotating machine will be operated as the electric power generator when the driving force generated at the expansion device is applied to the electric rotating machine.

10. A waste heat utilizing system according to claim 7, further comprising a first on-and-off means provided between the power transmitting means and the compressor device for intermittently transmitting the driving force from the power transmitting means to the compressor device, wherein the first on-and-off means is turned to its off-state when the driving force of the expansion device is transmitted to the compressor device.

11. A waste heat utilizing system according to one of claim 7, claim 8, claim 9, and claim 10, further comprising a second on-and-off means provided between the expansion device and the compressor device for intermittently transmitting the driving force from the expansion device to the compressor device, wherein the second on-and-off means is turned to its off-state when the driving force of the waste heat collecting cycle is not operated.

12. A waste heat utilizing system according to claim 7, wherein the power transmitting means comprises:
   a pulley operatively connected to the internal combustion engine and rotationally driven by the same; and
   an electric rotating machine having both functions of an electric motor for generating a rotational driving force and an electric power generator for generating electric power when driven by the outside driving source,
   wherein the compressor device, the pulley and the electric rotating machine are operatively connected to each other by a power distributing and transmitting means, which distributes and transmits the driving force from the expansion device to the compressor device and to the electric rotating machine.

13. A waste heat utilizing system according to claim 7, wherein the power transmitting means comprises:
   a pulley operatively connected to the internal combustion engine and rotationally driven by the same; and
   an electric rotating machine having both functions of an electric motor for generating a rotational driving force and an electric power generator for generating electric power when driven by outside driving source,
   wherein the compressor device, the pulley and the electric rotating machine are operatively connected to each other by a power distributing and transmitting means, which distributes and transmits the driving force from the pulley to the compressor device and to the electric rotating machine.

* * * * *